United States Patent [19]

Kotera et al.

[11] 4,400,619
[45] Aug. 23, 1983

[54] METHOD OF AND APPARATUS FOR OBTAINING A RADIATION IMAGE BY USE OF A STIMULABLE PHOSPHER

[75] Inventors: Noboru Kotera; Shusaku Eguchi, both of Odawara; Masanori Teraoka, Minami-ashigara; Kenji Takahashi, Minami-ashigara; Junji Miyahara, Minami-ashigara, all of Japan

[73] Assignee: Fuji Photo Film Co., Ltd., Kanagawa, Japan

[21] Appl. No.: 168,795

[22] Filed: Jul. 11, 1980

[30] Foreign Application Priority Data

Jul. 11, 1979 [JP] Japan ................... 54-87799

[51] Int. Cl.³ .................................. G01T 1/11
[52] U.S. Cl. .................... 250/327.2; 250/484.1
[58] Field of Search ............ 250/327.1, 337, 484

[56] References Cited

U.S. PATENT DOCUMENTS

| | | | |
|---|---|---|---|
| 3,603,791 | 9/1971 | Chenault et al. | 250/337 |
| 3,790,784 | 2/1974 | Webb et al. | 250/337 |
| 3,859,527 | 1/1975 | Luckey | 250/337 |
| 3,975,637 | 8/1976 | Ikedo et al. | 250/327.1 |
| 4,236,078 | 11/1980 | Kotera et al. | 250/327.2 |
| 4,239,968 | 12/1980 | Kotera et al. | 250/327.2 |

Primary Examiner—Davis L. Willis
Attorney, Agent, or Firm—Gerald J. Ferguson, Jr.; Joseph J. Baker

[57] ABSTRACT

A radiation image conversion panel is made of a stimulable phosphor which stores radiation energy when exposed to a radiation and emits light when stimulated by visible light or infrared rays. The panel is subjected to excitation before it is exposed to a radiation for recording or storing a radiation image therein by exposing the panel to light having a wavelength within the range of stimulating light wavelength of the stimulable phosphor used in the panel. By exciting the panel before exposure to radiation, the energy of radiation stored therein which will cause a noise is removed therefrom.

2 Claims, 5 Drawing Figures

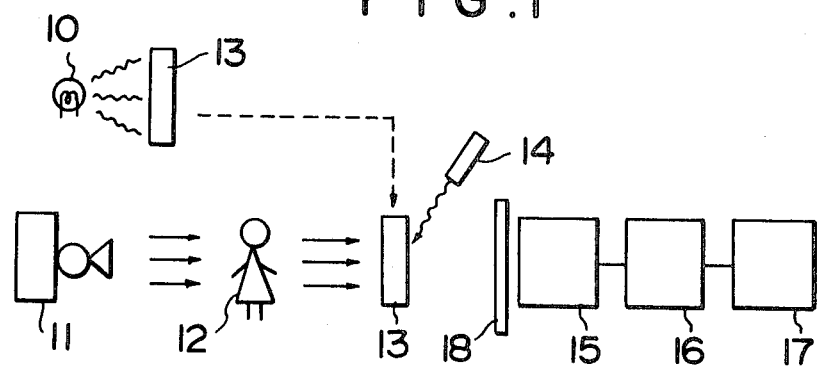
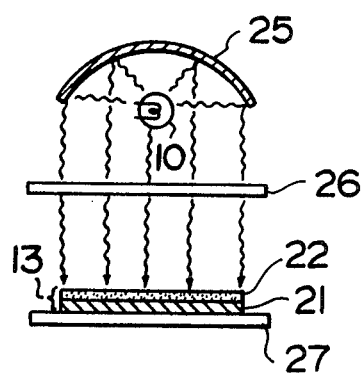
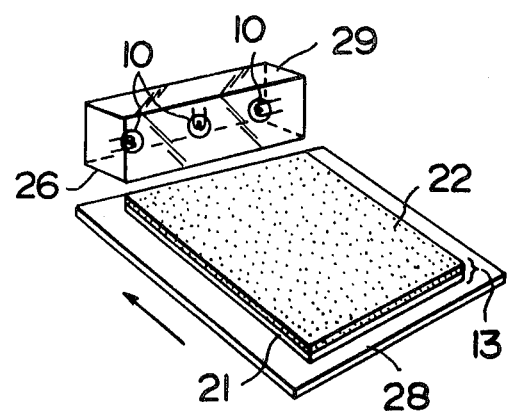
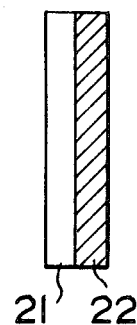
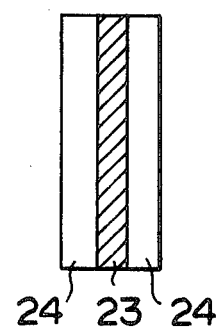

METHOD OF AND APPARATUS FOR OBTAINING A RADIATION IMAGE BY USE OF A STIMULABLE PHOSPHER

BACKGROUND OF THE INVENTION

1. Field of the Invention

This invention relates to a method of and apparatus for obtaining a radiation image, and more particularly to a method of and apparatus for obtaining a visible radiation image by use of a stimulable phosphor which is stimulable with visible light or infrared rays. The stimulable phosphor used in this invention records a radiation image in the form of a stored energy of a radiation upon exposure to the radiation and emits visible light when stimulated thereafter by visible light or infrared rays.

2. Description of the Prior Art

Heretofore, in order to obtain a radiation image there has been used a so-called radiography employing silver halides. Recently, due to the problem of shortage of silver resources, there has been a great demand for a radiation image recording system which does not use silver halides.

As one of the radiation image recording systems, a new method of radiation image recording is disclosed in U.S. Pat. No. 3,859,527. The method disclosed therein employs a stimulable phosphor which emits light when stimulated by visible light or infrared rays after exposes to a radiation such as X-rays, α-rays, β-rays, high energy neutrons, electron beams, vacuum ultra-violet rays, ultra-violet rays and other similar electromagnetic wave or corpuscular beam. In this method, a radiation image conversion panel is first exposed to a radiation having an image pattern and stores the radiation energy and then exposed to stimulating rays like visible light or infrared rays. Upon exposure to the stimulating rays, the phosphor emits light in accordance with the stored energy of radiation as fluorescent light. The light emitted upon stimulation is detected by a detecting means to visualize the radiation image.

The above described radiation image recording or visualizing system is very promising as a radiation image recording method replacing the above mentioned conventional radiography. However, in the above method utilizing a stimulable phosphor there is a defect in that the image is degraded by a noise and the sharpness is lowered when the radiation image conversion panel is repeatedly used many times or the panel is left to stand for many hours after once used. This is because it sometimes happens that the panel receives radiation energy of other radiations than the radiation used for recording the radiation image before the panel is subjected to exposure to the latter radiation, and that the stored energy of the other radiations emits light together with the energy of the latter radiation. In other words, when the radiation image conversion panel is let to stand for a long time, it absorbs the energy of radiation as of radiations emitted from radioactive isotopes like $^{226}$Ra and $^{40}$K minutely contained in the stimulable phosphor and the environmental radiations. The absorbed radiation energy is stored in the stimulable phosphor and causes the noise. Further, particularly when the panel is repeatedly used, the stored energy partly remains in the stimulable phosphor after the phosphor has been stimulated and emitted light in case that the stimulation is insufficient due to low intensity of the stimulating rays or improper wavelength of the stimulating rays. The remaining energy causes the noise in the subsequent recording process. The noise is prominently observed when the sensitivity of the radiation image conversion system which reads out the recorded image and converts the image into a visible image. The noise of course deteriorates the quality of the radiation image finally obtained and lowers the diagnostic efficiency and accuracy in case of handling a radiation image for diagnostic purposes. Therefore, there is a great demand for the improvement to eliminate the noise in the above described radiation image conversion or recording system.

SUMMARY OF THE INVENTION

The primary object of the present invention is to provide a radiation image conversion method or a method of obtaining a visible radiation image by use of a stimulable phosphor in which the noise is eliminated and a radiation image free of noise is obtained.

Another object of the present invention is to provide an apparatus for carrying out the above method of obtaining a radiation image.

The present invention is characterized in that the radiation image conversion panel is subjected to excitation before it is exposed to a radiation for recording or storing a radiation image therein by exposing the panel to light having a wavelength within the range of stimulating light wavelength of the stimulable phosphor used in the panel. By exciting the panel before exposure to radiation, the energy of radiation stored therein which will cause the noise is removed therefrom. Therefore, a sharp and clear radiation image can be obtained.

In summary, the radiation image conversion method in accordance with the present invention comprises steps of (i) exposing a radiation image conversion panel made of stimulable phosphor to a radiation which has passed through an object for causing the panel to absorb the energy of radiation, (ii) exposing the panel to stimulating rays having a wavelength within the range of stimulating light wavelength of the stimulable phosphor for causing the panel to emit the radiation energy absorbed therein as fluorescent light, and (iii) detecting the emitted light, wherein the improvement comprises exposing the panel to light having a wavelength within the range of stimulating light wavelength of the stimulable phosphor before the panel is exposed to the radiation, thereby removing the radiation energy remaining in the panel before the panel is exposed to the radiation.

Further, the radiation image conversion apparatus in accordance with the present invention comprises (i) a radiation image conversion panel made of stimulable phosphor for absorbing a radiation which has passed through an object, (ii) a light source for emitting stimulating rays which stimulate the stimulable phosphor to cause the phosphor to emit light, and (iii) a detector for detecting the light emitted by the stimulable phosphor, wherein the improvement comprises a noise removing means including a light source for emitting light having a wavelength within the range of stimulating light wavelength for exciting the stimulable phosphor to cause the phosphor to emit the radiation energy remaining therein before the panel is exposed to the radiation having passed through an object.

BRIEF DESCRIPTION OF THE DRAWING

FIG. 1 is a schematic view showing the radiation image conversion method in accordance with the present invention, FIG. 2A is a side sectional view showing an example of a noise removing means employed in the present invention, FIG. 2B is a perspective view showing another example of a noise removing means employed in the present invention, FIG. 3A is a sectional view of an example of the radiation image transfer panel employed in the present invention, and FIG. 3B is a sectional view of another example of the radiation image transfer panel employed in the present invention.

DESCRIPTION OF THE PREFERRED EMBODIMENTS

Referring to FIG. 1 which shows the whole system of the radiation image conversion method and apparatus of the present invention, a light source 10 emits light for removing the energy remaining in the radiation image conversion panel 13 which will cause the noise. A radiation generating device 11 like an X-ray source emits a radiation passing through an object 12 like a human body and impinges upon the radiation image conversion panel 13. A stimulating ray source 14 emits stimulating rays and stimulates the panel 13 with stimulating rays like visible light or infrared rays. The panel 13 is made of or includes a layer of a stimulable phosphor which emits light when stimulated with visible light or infrared rays. Faced to the radiation image conversion panel 13 is provided a photodetector 15 for detecting the light emitted from the panel 13. A reproducing device 16 is connected with the photodetector 15 to reproduce a radiation image from the electric signal obtained by the photodetector 15. A display device 17 is connected with the reproducing device 16 for displaying the reproduced image in a visible image on a CRT or the like. A cut filter 18 is located in front of the photodetector 15 to cut the stimulating rays reflected by the panel 13 and only passes the light emitted by the panel upon stimulation. It should be understood that the devices connected to the photodetector 15 are not limited to those described above but may be of other structure so long as they reproduce the radiation image recorded in the panel into a visible image.

The light emitted by the light source has a wavelength within the range of stimulating light wavelength and excites the radiation image conversion panel 13 to cause the panel 13 to emit light and removes the radiation energy stored therein. The radiation generated by the radiation generating devide 11 passes through the object 12 and carries information of the difference in transmittance of the object to the radiation in a pattern which is the radiation image information. The radiation having passed through the object 12 impinges upon the panel 13 and stores the energy of radiation in the panel 13 in an imagewise pattern which corresponds to the radiation image in accordance with the intensity of the radiation passing through the object 12. The radiation image conversion panel 13 absorbs the radiation. Electrons or holes are generated in the stimulable phosphor of the panel according to the absorbed energy of the radiation and are trapped at the trap level of the phosphor. Thus, a kind of latent image of the radiation image is formed in the stimulable phosphor of the panel. Then, upon stimulation of the stimulable phosphor of the panel 13 with the light energy of the stimulating rays from the stimulating ray source 14, the panel 13 emits light which can be detected by the photodetector 15. In detail, the stimulable phosphor of the panel 13 emits light upon stimulation in which the electrons or holes trapped at the trap level are driven out of the trap level in the form of fluorescent light. The intensity or amount of light emitted upon stimulation from the panel 13 is in proportion to the number of electrons or holes stored in the panel 13 and accordingly to the level of the radiation energy stored in the phosphor layer of the panel 13. The light emitted is converted to an electric signal by means of the photodetector 15 like a photomultiplier or photodiode. Then, the electric signal is reproduced into an image by the image reproducing device 16 and then displayed at the display device 17. Thus, a radiation image free of noise can be obtained.

FIGS. 2A and 2B show examples of the noise removing means employed in the above described invention. As the light source 10 for emitting visible light or infrared rays for exciting the stimulable phosphor to remove the remaining energy of radiation stored therein, a lamp which emits visible light or infrared rays like a tungsten lamp, halogen lamp and an infrared lamp can be used. Between the light source 10 and the radiation image conversion panel 13 is provided a filter 26 which cuts the light unnecessary for removing the noise like light of a wavelength shorter than the range of stimulating light wavelength for instance. The reason for the provision of the filter 26 is in that the panel will absorb the energy of the light having such a short wavelength and will increase the noise. Further, together with the filter 26 or separately from the filter 26, an infrared ray cutting filter may be provided between the light source 10 and the radiation image conversion panel to prevent the binder in the phosphor layer of the panel from being damaged by heat.

In the example shown in FIG. 2A, whole the area of the radiation image conversion panel 13 consisting of a substrate 21 and a phosphor layer 22 deposited thereon is exposed to the light from the light source 10 uniformly at once through the filter 26. The panel 13 is placed on a support board 27. Above the light source 10 is located a reflector 25 which reflects the light emitted upward from the light source 10 toward the whole area of the panel 13 so as to enhance the efficiency of the noise removing means.

In the example shown in FIG. 2B, whole the area of the radiation image conversion panel 13 is not exposed to the light from the light source 10 at once, but the panel 13 on a movable stage 28 is moved in the direction indicated by an arrow in FIG. 2B under a line of light sources 10 arranged in parallel to the surface of the panel 13 in the direction perpendicular to the direction of movement of the panel 13. Thus, the panel 13 is exposed to the light from one end to the other as the panel 13 moves and the energy stored therein is removed by excitation. In this example, the light sources 10 are provided in a housing 29 fixed above the panel 13. It will be understood that the housing 29 may be moved horizontally above the panel 13 with the panel 13 fixed at a fixed position.

The time required for the panel 13 to be exposed to the light from the light source 10 in order to completely remove the energy remaining in the panel 13 depends upon the amount of the energy stored, the wavelength of the light emitted from the light source 10, the intensity of the light from the light source 10 and so forth. However, in any of the above described embodiments the sufficient removal of the stored energy can be effected by exposure of several seconds to several minutes.

The structure of the radiation image conversion panel 13 employed in the present invention comprises a substrate 21 and a phosphor layer 22 deposited thereon as shown in FIG. 3A. The phosphor layer 22 is made of a stimulable phosphor which is stimulable to emit light by visible light or infrared rays. As the stimulable phosphor, can be used phosphors as follows for example:

(i) cerium and samarium activated strontium sulfide phosphor (SrS:Ce,Sm), (ii) europium and samarium activated strontium sulfide phosphor (SrS:Eu,Sm), (iii) europium and samarium activated lanthanum sulfide phosphor ($La_2O_2S$:Eu,Sm), (iv) manganese and halogen activated zinc cadmium sulfide phosphor [(Zn,Cd)S:Mn,X; X being a halogen], (v) fluorohalide phosphor represented by the formula of $(Ba_{1-x},M^{II}_x)FX$:yA wherein $M^{II}$ is at least one element selected from the group consisting of Mg, Ca, Sr, Zn and Cd, X is at least one element selected from the group consisting of Cl, Br and I, A is at least one element selected from the group consisting of Eu, Tb, Ce, Tm, Dy, Pr, Ho, Nd, Yb and Er, and x and y are numbers satisfying the conditions of $0 \leq x \leq 0.6$ and $0 \leq Y \leq 0.2$, (vi) oxyhalide phosphor represented by the formula of LnOX:zM wherein Ln is at least one element selected from the group consisting of La, Y, Gd and Lu, M is at least one element selected from the group consisting of Ce and Tb, X is at least one element selected from the group consisting of Cl, Br and I, and z is a number satisfying the condition of $0 < z \leq 0.1$, (vii) divalent metal silicate phosphor represented by the formula of $Me^{II}O \cdot pSiO_2$:D wherein $Me^{II}$ is at least one element selected from the group consisting of Mg, Ca, Sr, Zn, Cd and Ba, D is at least one element selected from the group consisting of Ce, Tb, Eu, Tm, Pb, Tl, Bi and Mn, and p is a number satisfying the condition of $0.5 \leq p \leq 2.5$, (viii) europium activated barium aluminate represented by the formula of $BaO \cdot qAl_2O_3$:Eu wherein q is a number satisfying the condition of $0.8 \leq q \leq 10$, and (ix) cupper and lead activated zinc sulfide phosphor (ZnS:Cu,Pb).

Among the above stimulable phosphors, particularly the $(Ba_{1-x},M^{II}_x)FX$:yA phosphor, LnOX:zM phosphor, $Me^{II}O \cdot pSiO_2$:D phosphor, $BaO \cdot qAl_2O_3$:Eu phosphor and ZnS:Cu,Pb phosphor are superior to the other phosphors in emitting light of higher intensity and accordingly providing a higher sensitivity radiation image conversion panel.

The radiation image conversion panel is manufactured by the following method for instance.

At first, 8 parts by weight of the stimulable phosphor and one part by weight of nitrocellulose are mixed together by use of a solvent (mixture of acetone, ethyl acetate and butyl acetate) to prepare a coating solution having a viscosity of about 50 centistokes. Then, the coating solution is uniformly applied to the surface of a horizontally placed substrate of polyethylene terephthalate film and let to stand for one day and night to be naturally dried. Thus, a phosphor layer having a thickness of about $300\mu$ is obtained on the substrate and a radiation image conversion panel is obtained. As the substrate can be used a transparent glass plate or a metal plate as of aluminium. The thickness of the phosphor layer 22 is generally preferred to be 50 to $1000\mu$.

The radiation image conversion panel 13 may have a structure as shown in FIG. 3B in which a phosphor layer 23 is sandwiched between a pair of substrates 24 like glass plates.

As the light source 14 for emitting the stimulating rays for stimulating the phosphor on the panel 13 and cause the phosphor to emit light detectable by the photodetector 15 can be used a light source which emits light having a wavelength within the range of the stimulating ray wavelength. The light source 14 may emit light having a band spectrum or a monochromatic light like a He-Ne laser beam (633 nm), a YAG laser beam (1064 nm), a ruby laser beam (694 nm), and the like. Particularly when the laser beam is used, high energy can be obtained.

What is claimed is:

1. In a radiation image conversion method comprising steps of
   exposing a radiation image conversion panel made of stimulable phosphor to a radiation which has passed through an object for causing the panel to absorb the energy of radiation,
   exposing the panel to stimulating rays having a wavelength within the range of stimulating light wavelength of the stimulable phosphor for causing the panel to emit the radiation energy absorbed therein as fluorescent light, and
   detecting the emitted light,
   wherein the improvement comprises
   employing as said stimulable phosphor is at least one of the phosphors selected from the group consisting of
   (i) fluorohalide phosphor represented by the formula of $(Ba_{1-x},M^{II}_x)FX$:yA wherein $M^{II}$ is at least one element selected from the group consisting of Mg, Ca, Sr, Zn and Cd, X is at least one element selected from the group consisting of Cl, Br and I, A is at least one element selected from the group consisting of Eu, Tb, Ce, Tm, Dy, Pr, Ho, Nd, Yb and Er, and x and y are numbers satisfying the conditions of $0 \leq x \leq 0.6$ and $0 \leq y \leq 0.2$,
   (ii) oxyhalide phosphor represented by the formula of LnOX:zM wherein Ln is at least one element selected from the group consisting of La, Y, Gd and Lu, M is at least one element selected from the group consisting of Ce and Tb, X is at least one element selected from the group consisting of Cl, Br and I, and z is a number satisfying the condition of $0 < z \leq 0.1$, and
   (iii) divalent metal silicate phosphor represented by the formula of $Me^{II}O \cdot pSiO_2$:D wherein $Me^{II}$ is at least one element selected from the group consisting of Mg, Ca, Sr, Zn, Cd and Ba, D is at least one element selected from the group consisting of Ce, Tb, Eu, Tm, Pb, Tl, Bi and Mn, and p is a number satisfying the condition of $0.5 \leq p \leq 2.5$, and exposing the panel to light having a wavelength within the range of stimulating light wavelength of the stimulable phosphor before the panel is exposed to the radiation, thereby removing the radiation energy remaining in the panel before the panel is exposed to the radiation.

2. In a radiation image conversion apparatus comprising
- a radiation image conversion panel made of stimulable phosphor for absorbing a radiation which has passed through an object,
- a light source for emitting stimulating rays which stimulate the stimulable phosphor to cause the phosphor to emit light, and
- a detector for detecting the light emitted by the stimulable phosphor, wherein the improvement comprises a noise removing means including a light source for emitting light having a wavelength within the range of stimulating light wavelength for exciting the stimulable phosphor to cause the phosphor to emit the radiation energy remaining therein before the panel is exposed to the radiation having passed through an object where said stimulable phosphor is at least one of the phosphors selected from the group consisting of (i) fluorohalide phosphor represented by the formula of $(Ba_{1-x}, M^{II}_x)FX:yA$ wherein $M^{II}$ is at least one element selected from the group consisting of Mg, Ca, Sr, Zn and Cd, X is at least one element selected from the group consisting of Cl, Br and I, A is at least one element selected from the group consisting of Eu, Tb, Ce, Tm, Dy, Pr, Ho, Nd, Yb and Er, and x and y are numbers satisfying the conditions of $0 \leq x \leq 0.6$ and $0 \leq y \leq 0.2$, (ii) oxyhalide phosphor represented by the formula of LnOX:zM wherein Ln is at least one element selected from the group consisting of La, Y, Gd and Lu, M is at least one element selected from the group consisting of Ce and Tb, X is at least one element selected from the group consisting of Cl, Br and I, and z is a number satisfying the condition of $0 < z \leq 0.1$, and (iii) divalent metal silicate phosphor represented by the formula of $Me^{II}O.pSiO_2:D$ wherein $Me^{II}$ is at least one element selected from the group consisting of Mg, Ca, Sr, Zn, Cd and Ba, D is at least one element selected from the group consisting of Ce, Tb, Eu, Tm, Pb, Tl, Bi and Mn, and p is a number satisfying the condition of $0.5 \leq p \leq 2.5$.

* * * * *